(12) United States Patent
Ooi et al.

(10) Patent No.: US 11,281,611 B2
(45) Date of Patent: Mar. 22, 2022

(54) GENERAL PURPOSE INTERFACE BUS (GPIB) SNIFFER SYSTEM AND METHOD

(71) Applicant: Jabil Inc., St. Petersburg, FL (US)

(72) Inventors: Kooi Heng Ooi, Bayan Lepas (MY); Hock Hee Lim, Bayan Lepas (MY); Gim Hian Chew, Bayan Lepas (MY); Shiuh Deh Liew, Bayan Lepas (MY); Lee Shyue Choong, Gelugor (MY)

(73) Assignee: Jabil Inc., St. Petersburg, FL (US)

( * ) Notice: Subject to any disclaimer, the term of this patent is extended or adjusted under 35 U.S.C. 154(b) by 0 days.

(21) Appl. No.: 16/770,718

(22) PCT Filed: Dec. 6, 2018

(86) PCT No.: PCT/MY2018/050088
§ 371 (c)(1),
(2) Date: Jun. 8, 2020

(87) PCT Pub. No.: WO2019/112417
PCT Pub. Date: Jun. 13, 2019

(65) Prior Publication Data
US 2021/0081342 A1    Mar. 18, 2021

(30) Foreign Application Priority Data
Dec. 8, 2017    (MY) .......................... PI 2017704741

(51) Int. Cl.
*G06F 13/38* (2006.01)
*G06F 1/14* (2006.01)
(Continued)

(52) U.S. Cl.
CPC .............. *G06F 13/382* (2013.01); *G06F 1/14* (2013.01); *G06F 1/263* (2013.01);
(Continued)

(58) Field of Classification Search
CPC ............... G06F 13/382; G06F 13/4059; G06F 13/4291; G06F 1/14; G06F 1/263; G06F 11/3027
See application file for complete search history.

(56) References Cited

U.S. PATENT DOCUMENTS 5,649,123 A    7/1997   Kowert
5,964,892 A    10/1999  Tang et al.
(Continued)

FOREIGN PATENT DOCUMENTS

CN    200979741 Y    11/2007
CN    102809946 A    12/2012
WO    2017046789 A1    3/2017

OTHER PUBLICATIONS

Jabil—"Jabil's Reference Design Modules"; 2 pages, Dated 2018 (Year: 2018).*

(Continued)

*Primary Examiner* — Brian T Misiura
(74) *Attorney, Agent, or Firm* — Young Basile Hanlon & MacFarlane, P.C.

(57) ABSTRACT

A sniffer bus-based network General Purpose Interface Bus (GPIB) module includes two functional units. One is Data Acquisition Unit (DAU) module, and the other one is Data Processing Unit (DPU) module. The DPU is configured to receive data from the (DAU) module and converting the data by time-stamping and a host server configured to receive JSON format data via a communication network. Further, captured data is transferred to the cloud for big data analysis to obtain the specifics of equipment utilization and evaluate the overall efficiency of the test system.

19 Claims, 7 Drawing Sheets

(51) Int. Cl.
   *G06F 1/26*    (2006.01)
   *G06F 11/30*   (2006.01)
   *G06F 13/40*   (2006.01)
   *G06F 13/42*   (2006.01)

(52) U.S. Cl.
   CPC ...... *G06F 11/3027* (2013.01); *G06F 13/4059* (2013.01); *G06F 13/4291* (2013.01)

(56) References Cited

U.S. PATENT DOCUMENTS

| | | | |
|---|---|---|---|
| 7,200,691 B2 * | 4/2007 | Ali Khan | G06F 13/28 |
| | | | 702/190 |
| 7,340,365 B2 * | 3/2008 | Wubbena | H04L 43/50 |
| | | | 324/537 |
| 8,472,626 B2 | 6/2013 | Bloch et al. | |
| 8,472,967 B2 | 6/2013 | Ghosh et al. | |
| 8,473,110 B2 | 6/2013 | Leany et al. | |
| 8,473,200 B1 | 6/2013 | Manber et al. | |
| 8,762,098 B2 * | 6/2014 | Liu | G01R 31/2817 |
| | | | 702/130 |
| 9,185,125 B2 * | 11/2015 | Varsanyi | G06F 21/552 |
| 9,201,633 B2 * | 12/2015 | Kalapati | G06F 8/34 |
| 10,877,094 B2 * | 12/2020 | Wendler | G01R 31/31912 |
| 2005/0091311 A1 * | 4/2005 | Lund | G08B 13/1968 |
| | | | 709/203 |
| 2007/0185680 A1 | 8/2007 | Kambe et al. | |
| 2007/0273419 A1 * | 11/2007 | Conway | G01R 19/2516 |
| | | | 327/161 |
| 2015/0339252 A1 | 11/2015 | Anderson et al. | |
| 2016/0112216 A1 | 4/2016 | Sargent et al. | |
| 2016/0124722 A1 * | 5/2016 | Mathew | G06F 8/40 |
| | | | 717/136 |
| 2017/0228814 A1 | 8/2017 | Harman | |
| 2021/0048796 A1 * | 2/2021 | Rieger | G05B 19/4183 |

OTHER PUBLICATIONS

Extended European Search Report dated Aug. 13, 2021 from European Application No. 18886820, 9 pages.

* cited by examiner

GENERAL PURPOSE INTERFACE BUS (GPIB) SNIFFER SYSTEM AND METHOD

CROSS-REFERENCE TO RELATED APPLICATION

This application claims priority to and the benefit of Malaysian Patent Application No. PI 2017704741 filed Dec. 8, 2017, the entire disclosure of which is hereby incorporated by reference.

TECHNICAL FIELD

Embodiments of the present invention pertains to system and method relates to General Purpose Interface Bus (GPIB) which captures and displays captures traffic on the GPIB bus. The present invention relates to software diagnostic tools for monitoring and displaying events made to driver software by two of its main units Data Acquiring Unit and Data Processing Unit.

BACKGROUND

Traditionally, various methods for measuring instruments connected onto a GPIB bus. For integrating and designing a system of test instruments for performing a number of tests and measurements on a device under test (DUT), it is important to insure that operations of the test instruments are properly timed and coordinated to insure that the test operations perform as expected.

The GPIB, otherwise referred to as the Institute of Electrical and Electronic Engineers IEEE-488 interface bus, is designed for remote control of programmable instruments. The IEEE 488 bus, also referred to as the General Purpose Interface Bus (GPIB), is used for connecting instruments and controllers to a common bus to perform various test and measurement functions. A typical GPIB system comprises one or more GPIB instruments up to 14 instruments, and a controller, typically a GPIB interface board installed in a general purpose computer, connected by standard GPIB cables. A GPIB software application executes on the computer to control the instruments. The GPIB application interfaces through GPIB driver level software to the GPIB controller. In response to the GPIB application, the controller provides program commands to the instruments, and the instruments return formatted data and response messages to the controller. GPIB instruments are message-based devices which are programmed with high-level ASCII character strings. A respective GPIB device includes a local processor that parses the command strings and sets the appropriate register bits to perform the indicated functions.

Big data analytics is a relatively new approach to managing large amounts of data. As used herein, the term "big data" is used to describe unstructured and semi-structured data in such large volumes (for example, petabytes or exabytes of data) as to be immensely cumbersome to load into a relational database for analysis. The GPIB devices can be listeners, talkers and/or controllers. A talker sends data messages to one or more listeners, which receive the data. The controller manages the flow of information on the GPIB by sending commands to all devices. Some devices may perform several functions, such as a digital volt meter which acts as a talker by sending voltage information on the GPIB and as a listener when receiving configuration and control information. Usually, there is only one controller for a given GPIB where multiple GPIB devices are further coupled to the GPIB for receiving command information from the controller for interfacing the other GPIB devices.

Conventionally, it is noted that some GPIB configurations do not require a controller if only one device would be considered a talker and the remaining devices are listen-only devices. A controller is necessary when the active or addressed talker or listener must be changed or reconfigured where such control functions are usually handled by a computer device. Also, there may be multiple controllers on a given GPIB, although only one controller is the controller-in-charge (CIC) at any given time.

Moreover, for a test system managed via the GPIB bus, various test and measurement instruments are connected to the bus as GPIB devices. A computer with the corresponding test application software is also connected to the bus which acts as the GPIB bus controller. However, there remains a need in the art to provide a system and method to connect to the GPIB bus which is able to capture events on the bus without interrupting existing operation of the test system.

In the current era PCI or PCI Express boards are available. However, PC with PCI slot or PCI Express slot is required to plug in those boards. The cost of the PC plus the board is quite high and the PC plus the board take up a large space during deployment. Generally, the GPIB traffic captured by the board is shown locally on the PC monitor to the user and there is no easy way to transfer the data to the cloud. The main use of the board is to troubleshoot and solve GPIB hardware and software problems, and the PC plus the board is not used for collecting data for big data analysis.

U.S. patent application Ser. No. 08/473,110, filed on Jun. 7, 1995, entitled "GPIB System for Capturing GPIB Signals at a Predetermined Rate and Upon Transitions of the Data Valid Signal"; U.S. patent application Ser. No. 08/473,200, filed on Jun. 7, 1995, entitled "GPIB System Including Real Time Time-stamp"; U.S. patent application Ser. No. 08/472,967 filed on Jun. 7, 1995, entitled "GPIB System Including Deglitch Method and Apparatus to Assure Valid Data Sampling"; and U.S. patent application Ser. No. 08/472,626, filed on Jun. 7, 1995, entitled "GPIB System with Improved Parallel Poll Response Detection". All of the applications are assigned to the same assignee.

Accordingly, there remains a need in the prior art to develop a General Purpose Interface Bus (GPIB) sniffer system and method. The present invention provides a system where the data captured by the system is communicated to the cloud for big data analysis to obtain the specifics of equipment utilization and evaluate the overall efficiency of one or more test systems.

SUMMARY

The present invention is a GPIB Sniffer which is connected to the test system and captures events from the test system without interrupting existing operation of the test system. Particularly, the test system consist of GPIB Controller and different types of GPIB devices. For example, GPIB devices may be any one of test and measurement equipments, and instruments like power supplies, multimeters, oscilloscopes and the like.

Embodiments of the present disclosure relates to system and methods connected in a bus-based network, a General Purpose Interface Bus (GPIB) sniffer consisting of Data Acquisition Unit (DAU) module, a Data Processing Unit (DPU) module. Particularly, the General Purpose Interface Bus (GPIB) module is configured to transmit and receive data in a General Purpose Interface Bus (GPIB) format. The Data Acquisition Unit (DAU) module is configured to capture data traffic on a General Purpose Interface Bus (GPIB) bus, and the Data Processing Unit (DPU) module is configured to receive data from the Data Acquisition Unit (DAU) module and convert the data by time-stamping in a JavaScript Object Notation (JSON) format. Further, the host server is configured to receive JSON format data via a communication network.

In one and more embodiments of present invention, the Data Acquisition Unit (DAU) module is configured to capture traffic without participating in General Purpose Interface Bus (GPIB) handshake mechanism and appearing "transparent" to all other GPIB devices on the bus.

In particular DPU receives data from DAU and data is processed and formatted before being transmitted to the server on the network via LAN cable. Moreover, DPU establishes a secure communication channel with the server for transmission of data. Furthermore, the server is listening on certain port number(s).

Embodiments of the present disclosure relates to a method for analyzing data in a test system by one or more communication connections. Particularly, the method includes the steps of transmitting and receiving data in a General Purpose Interface Bus (GPIB) format, capturing data traffic on a General Purpose Interface Bus (GPIB) bus, receiving data and converting the data to generate time-stamped data executed by the Data Processing Unit (DPU) module, and communicating the time-stamped data to a host server, and processing the time-stamped data to output information about timing of the data stored.

The Data Acquisition Unit (DAU) module of General Purpose Interface Bus (GPIB) system includes a General Purpose Interface Bus (GPIB) transceiver providing the electrical compatibility between DAU and GPIB Bus. The GPIB Transceiver is designed to meet the requirements of IEEE Standard 488.1.

Particularly, the data acquisition Unit (DAU) module is configured to capture traffic without participating in General Purpose Interface Bus (GPIB) handshake mechanism.

The Data Processing Unit (DPU) module of General Purpose Interface Bus (GPIB) sniffer includes a Central Computing Unit which extracts information and constructing messages in the JSON format timestamping the messages and delivering them to the JSON server on the network. In particular, a Real-time Clock (RTC) for time-stamping the JSON messages and keeping track record, and battery backup protecting the Central Computing Unit (CCU) from system and data corruption during unplanned power outage.

Moreover, Data DPU has a visual display for displaying status information of the DPU to the users, a keypad enabling the users to control the DPU locally and a interconnect board providing means for connecting the RTC, the backup battery, the visual display, the keypad and the power supply to the central computing module.

The data captured by the GPIB Sniffer is then transferred to the cloud for big data analysis to obtain the specifics of equipment utilization and evaluate the overall efficiency of the test system.

BRIEF DESCRIPTION OF THE DRAWINGS

So that the manner in which the above recited features of the present invention is be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

A better understanding of the present invention can be obtained when the following detailed description of the preferred embodiment is considered in conjunction with the following drawings, in which.

DETAILED DESCRIPTION

Various embodiments of the present invention provide systems, and methods to connect to the General Purpose Interface Bus (GPIB) test system and captures events on the bus without interrupting existing operation of a test system. The data captured by the present system are transferred to the cloud for big data analysis to obtain the specifics of equipment utilization and evaluate the overall efficiency of the test system. The present invention provide systems to connect to the GPIB Bus and captures events on the bus without interrupting existing operation of the test system. Moreover, the principles of the present invention and their advantages are best understood by referring to FIG. 1 to FIG. 7.

In the following detailed description of illustrative or exemplary embodiments of the disclosure, specific embodiments in which the disclosure may be practiced are described in sufficient detail to enable those skilled in the art to practice the disclosed embodiments. For example, specific details such as specific method steps, structures, elements, and connections are presented herein. However, it is to be understood that the specific details presented need not be utilized to practice the embodiments of the present disclosure.

The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

Figure 1:
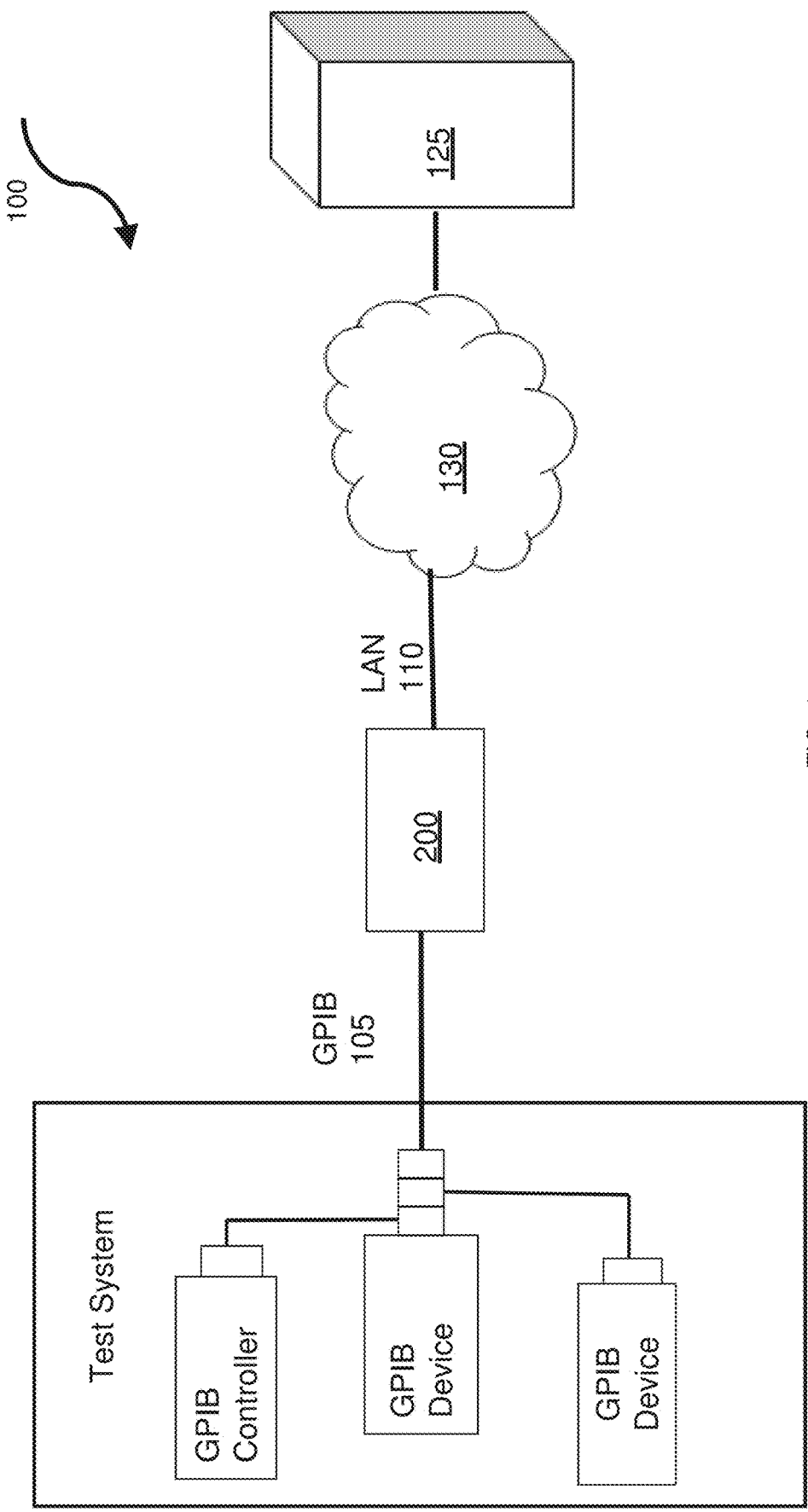
FIG. 1 illustrates a block diagram of schematic configuration of General Purpose Interface Bus (GPIB) sniffer in accordance with an embodiment of the present invention.

FIG. 1 illustrates a block diagram of schematic configuration of General Purpose Interface Bus (GPIB) sniffer in accordance with an embodiment of the present invention. A General Purpose Interface Bus (GPIB) sniffer system 100 which is a bus-based network including a Data Acquisition Unit (DAU) module 115 configured to capture data traffic on a General Purpose Interface Bus (GPIB) bus. Particularly, Data Processing Unit (DPU) module 120 is configured to receive data from the Data Acquisition Unit (DAU) module 115 and convert the data by time-stamping in a prescribed format. Moreover, it has a host server 125 configured to receive the prescribed format data via a communication network 130.

In some implementations, the host server 125 can communicate wirelessly through a communication interface (not shown), which may include digital signal processing circuitry where necessary. The communication interface can provide for status information of the firmware developed for the sniffer system under various modes or protocols, AM signal, an FM signal, a phase modulated signal, CDMA, TDMA, spread spectrum, the Internet, a WiFi connection, a Bluetooth connection, a Zigbee connection, a network, a wireless network, a 3G network, a 4G network, a USB connection, or any combination thereof.

In another embodiment the communication interface can provide for status information of the firmware developed for the sniffer system under various modes or protocols using the wireless device via the Internet, a WiFi connection, a network, a wireless network, a USB connection, or any combination thereof.

In another embodiment the communication interface can provide status information of the firmware developed for the sniffer system under various modes or protocols based on FM signal, a phase modulated signal, CDMA, TDMA, spread spectrum, the Internet, a WiFi connection, a Bluetooth connection, a Zigbee connection, a network, a wireless network, a 3G network, a 4G network, a USB connection, or any combination thereof. In addition, short-range communication may occur, such as using a Bluetooth, WiFi, or other such transceiver. In some implementations, the system 100 can be a distributed client/server system that spans one or more networks such as the network 130. The network 130 can be a large computer network, such as a local area network (LAN), wide area network (WAN), the Internet, a cellular network, or a combination thereof connecting any number of mobile clients, fixed clients, and servers.

In some implementations, each client (e.g., computing devices not shown) can communicate with server 125 via a virtual private network (VPN), Secure Shell (SSH) tunnel, or other secure network connection. In some implementations, the network 130 can further include a corporate network (e.g., internet) and one or more wireless access points.

Figure 2:
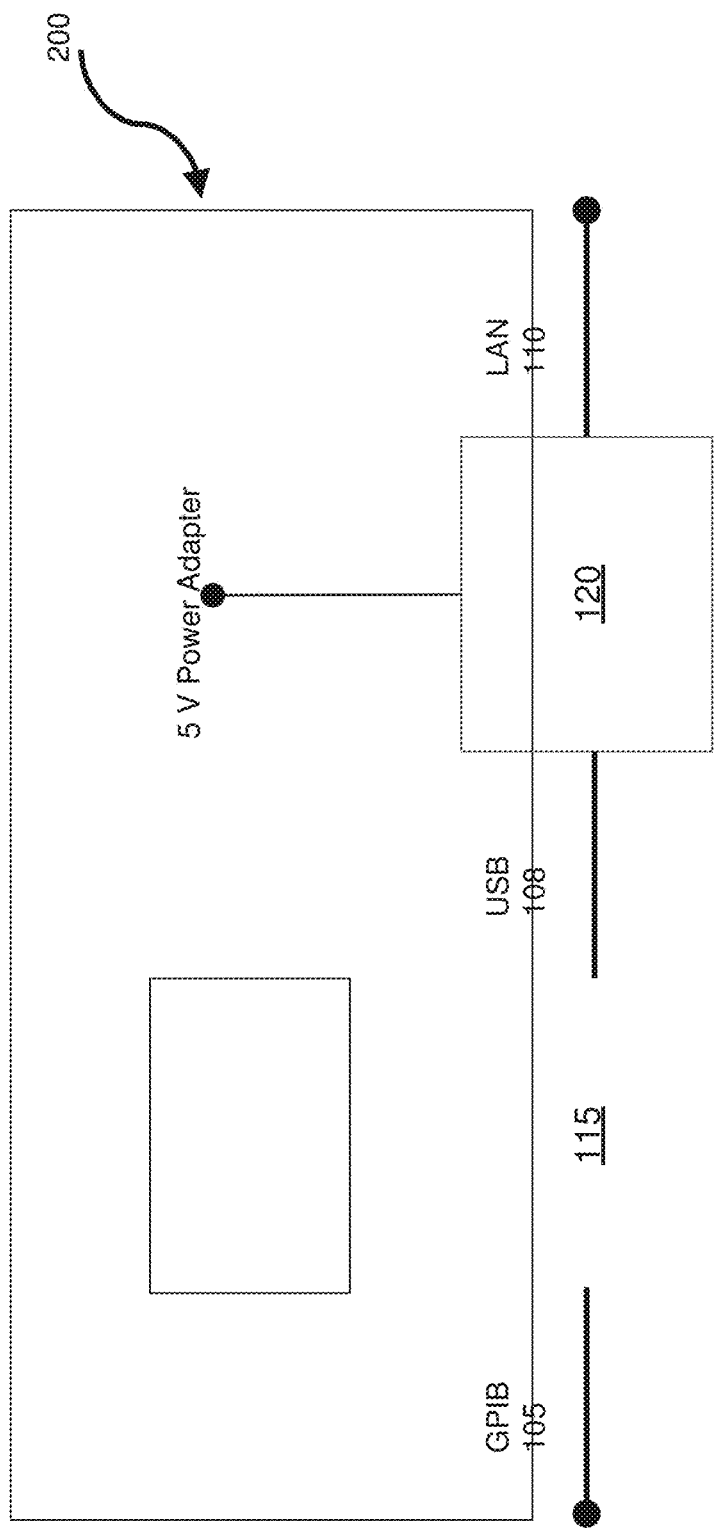
FIG. 2 illustrates a block diagram of schematic configuration of two main functional units of the General Purpose Interface Bus sniffer Data Acquisition Unit (DAU) module and Data Processing Unit (DPU) module, in accordance with an embodiment of the present invention.

FIG. 2 illustrates a block diagram 200 of schematic configuration of two main functional units of the General Purpose Interface Bus sniffer Data Acquisition Unit (DAU) module and Data Processing Unit (DPU) module, in accordance with an embodiment of the present invention. Particularly, the two main functional units of the sniffer system 100 are the Data Acquisition Unit (DAU) module 115 and Data Processing Unit (DPU) module 120. Particularly, the General Purpose Interface Bus (GPIB) module 105 is configured to transmit and receive data in a General Purpose Interface Bus (GPIB) format. The Data Acquisition Unit (DAU) module 115 is configured to capture data traffic on a General Purpose Interface Bus (GPIB) bus 105.

Particularly, the Data Processing Unit (DPU) module 120 is configured to receive data from the Data Acquisition Unit (DAU) module 115 and convert the data by time-stamping in a JSON format. In operation, the host server 125 is configured to receive JSON format data via a communication network 130. Moreover, the Data Acquisition Unit (DAU) module 115 is configured to capture traffic without participating in General Purpose Interface Bus (GPIB) handshake mechanism. To capture traffic on the GPIB bus the DAU appears to be "transparent" to other GPIB devices on the bus.

Figure 3:
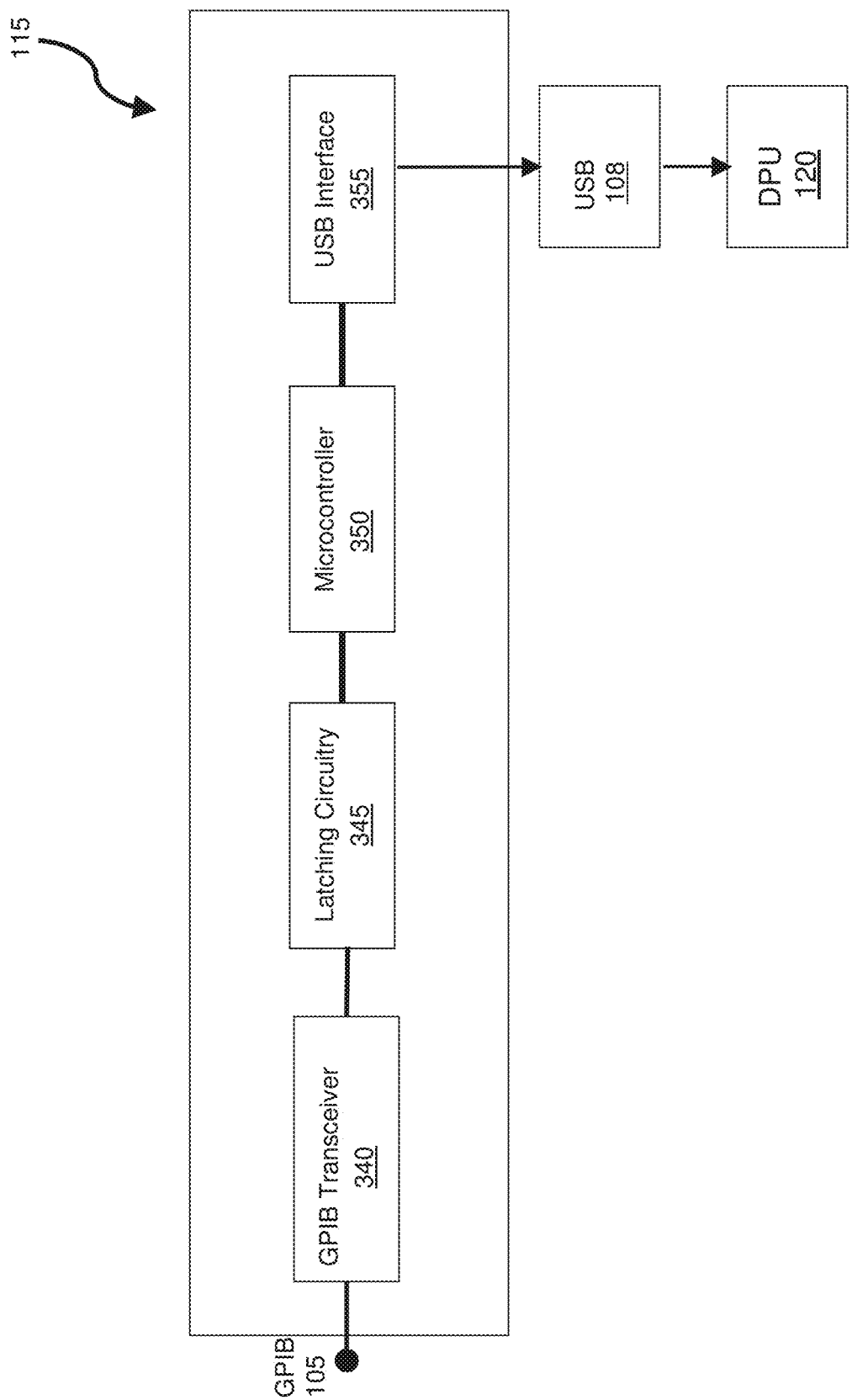
FIG. 3 illustrates a block diagram of schematic configuration of Data Acquisition Unit (DAU) module of General Purpose Interface Bus (GPIB) sniffer, in accordance with an embodiment of the present invention.

FIG. 3 illustrates a block diagram of schematic configuration of Data Acquisition Unit (DAU) module 115. module 120 in accordance with an embodiment of the present invention. The Data Acquisition Unit (DAU) module 115 of General Purpose Interface Bus (GPIB) sniffer system 100 includes a General Purpose Interface Bus (GPIB) transceiver 340, operably configured to provide an electrical compatibility between Data Acquisition Unit (DAU) module 115 and General Purpose Interface Bus (GPIB). Particularly, the Data Acquisition Unit (DAU) module 115 also has latching circuitry 345 configured to latch a data signal.

Moreover, a data input receives the data signal by Microcontroller (MCU) 350 retrieving the data signal state captured by the latching circuitry 345. Furthermore, a universal serial bus (USB) interface 355 is configured to be coupled to the Microcontroller (MCU) 350 for transferring the data signal to the Data Processing Unit (DPU) module 120. Particularly, the Data Acquisition Unit (DAU) module 115 is configured to capture data traffic without participating in General Purpose Interface Bus (GPIB) handshake mechanism.

Figure 4:
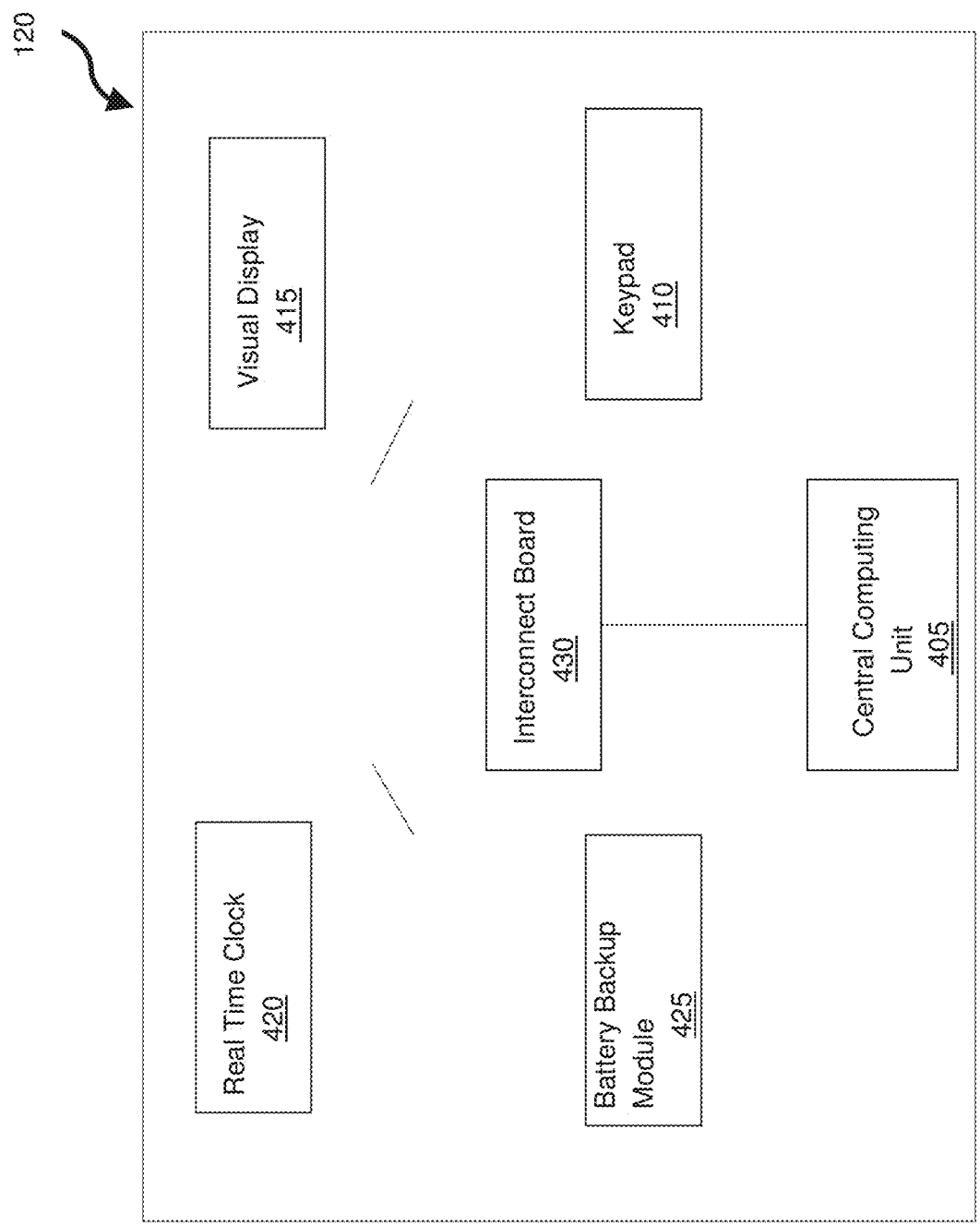
FIG. 4 illustrates a block diagram of schematic configuration of Data Processing Unit (DPU) module of General Purpose Interface Bus (GPIB) sniffer, in accordance with an embodiment of the present invention.

FIG. 4 illustrates a block diagram of schematic configuration of Data Processing Unit (DPU) module 115. The Data Processing Unit (DPU) module 120 of General Purpose Interface Bus (GPIB) sniffer system 100 includes a central computing module 405 having an instruction for constructing messages. Particularly, the Data Processing Unit (DPU) module 120 establish a secure communication channel with the host server 125 for data transmission. The host server 125 is configured on certain port numbers.

Moreover, the Data Processing Unit (DPU) module 120 has a Real-time Clock (RTC) 420 configured to provide time-stamping of the prescribed format data and provide system time for keeping track record of prescribed format data. Furthermore, battery backup module 425 is configured to protect the central computing module 405 from data corruption during unplanned power outage. The central computing module 405 of DPU 120 extracts data captured by Data Acquisition Unit (DAU) module 115 such as Talker and Listeners and timestamp the data and convert the data into JSON message format and deliver the data to a JSON server 125. Subsequently, a visual display interface is configured to display status information of the Data Processing Unit (DPU) 120 to one or more users and a keypad input configured to enable multiple users to control the Data Processing Unit (DPU) module 120. Further, to develop a firmware for displaying status information from the DPU 120, the present system enables users to remotely control the DPU 120 through a network 130 tighten the security of DPU 120, including encrypting the data sent via network 130.

Figure 5:
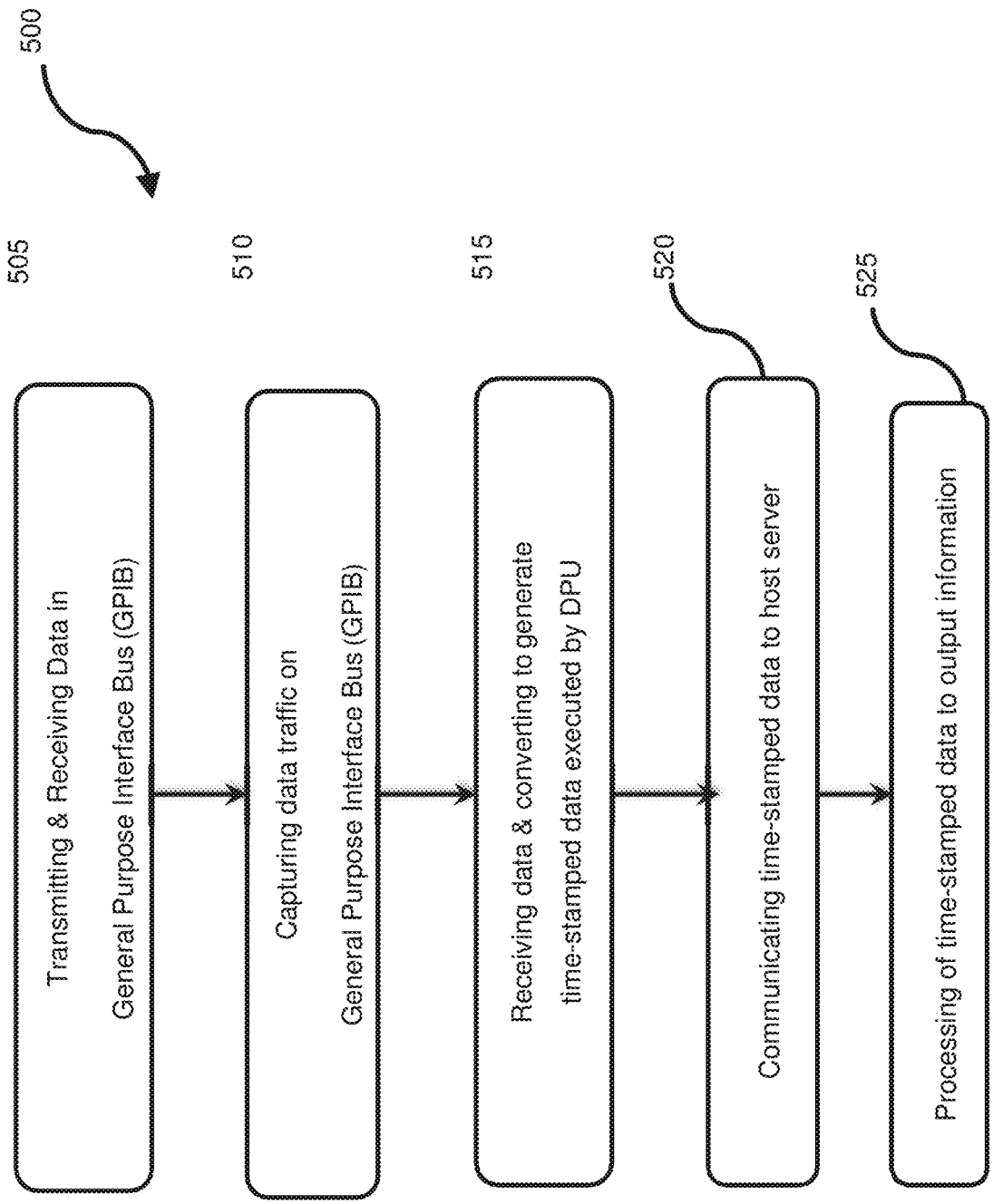
FIG. 5 illustrates a flow diagram illustrating method for analyzing data in a General Purpose Interface Bus (GPIB) sniffer system by one or more communication connections for in accordance with one or more embodiment of the present invention.

FIG. 5 illustrates a flow diagram illustrating method for analyzing data in a General Purpose Interface Bus (GPIB) sniffer system 100 by one or more communication connections for in accordance with one or more embodiment of the present invention. The method 500 for analyzing data analyzing data in a General Purpose Interface Bus (GPIB) sniffer system 100 by one or more communication connections starts at step 505. At step 505, the method 500 includes the step of transmitting and receiving data in the General Purpose Interface Bus (GPIB) format. The method 500 proceeds to step 510. At step 510, data traffic on the General Purpose Interface Bus (GPIB) bus 105 is captured for processing to data units.

The method 500 proceeds to step 515. At step 515, the data received is converted to generate time-stamped data executed by the Data Processing Unit (DPU) module 115. The method 500 proceeds to step 520. At step 520, the time-stamped data is communicated to the host server 125. The method 500 proceeds to step 525. At step 525, the time-stamped data is processed to output information about timing of the data stored.

In one or more embodiment in accordance with the present generation, the time-stamping of the data is in JSON format.

In another embodiment, the method 500 further include the step of developing a firmware for displaying status information of the sniffer system 100.

In yet another embodiment, of the present invention, the method 500 further includes the steps of remotely controlling the sniffer system 100 by at least one client device (not shown).

In yet another embodiment, the data are events on at least one of the GPIB bus. In operation to tighten the security of data transmitted by DAU 115, the data is encrypted by DPU module 120. Particularly, the data encrypted is communicated via the computer network 130. Accordingly, the data captured by the present invention is transferred to the cloud for big data analysis to obtain the specifics of equipment utilization and evaluate the overall efficiency of the test system. Moreover, the present invention is developed as a standalone equipment, and a personal computer is not needed for its operation. Further, the events captured from the GPIB bus are timestamped and sent to the cloud automatically. Further, the present invention provides a low cost solution and the present invention is small in size.

Figure 6:
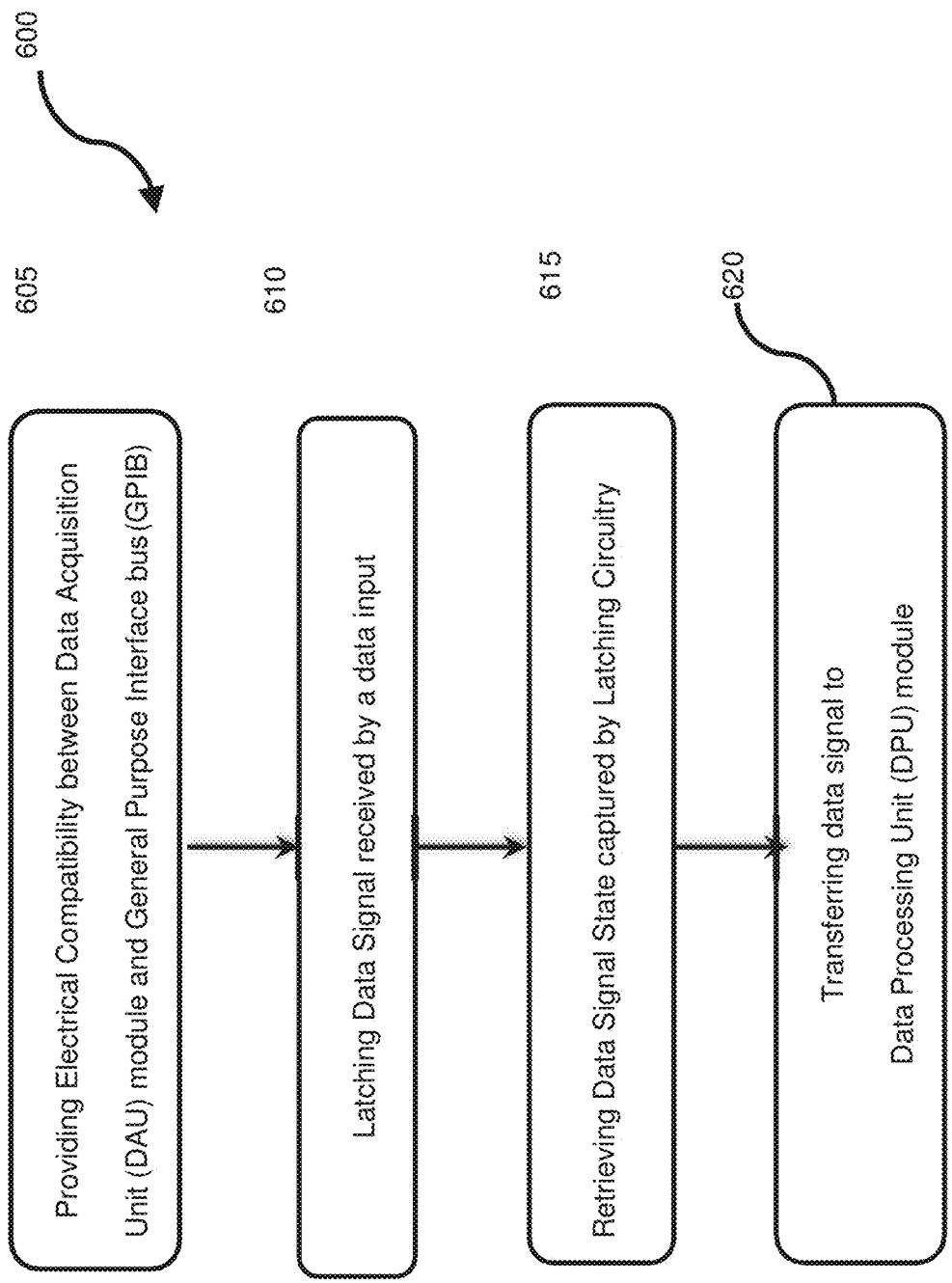
FIG. 6 illustrates a flow diagram illustrating steps for analyzing data by the Data Acquisition Unit (DAU) module of General Purpose Interface bus (GPIB) sniffer system.

FIG. 6 illustrates a flow diagram illustrating steps for analyzing data by the Data Acquisition Unit (DAU) module 115 of General Purpose Interface Bus (GPIB) sniffer system 100. The method 600 for analyzing data by the Data Acquisition Unit (DAU) module 115 of General Purpose Interface Bus (GPIB) sniffer system 100 is configured to execute a set of instructions. At step 605, the method 600 includes the step of transmitting and receiving data in the General Purpose Interface Bus (GPIB) format. At step 605, electrical compatibility is provided between the Data Acquisition Unit (DAU) module 115 and the General Purpose Interface Bus (GPIB).

The method 600 proceeds to step 610. At step 610, the data signal is latched and received by data input. The method 600 then proceeds to step 615. At step 615, the data signals are retrieved and captured by the latching circuitry 345.

The method 600 then proceeds to step 620. At step 620, data signal are transferred to the Data Processing Unit (DPU) module 120 via the universal serial bus (USB) interface 355. Particularly, the universal serial bus (USB) interface 355 is configured to be coupled to the Microcontroller (MCU) 350 for transferring the data signal to the Data Processing Unit (DPU) module 120.

Figure 7:
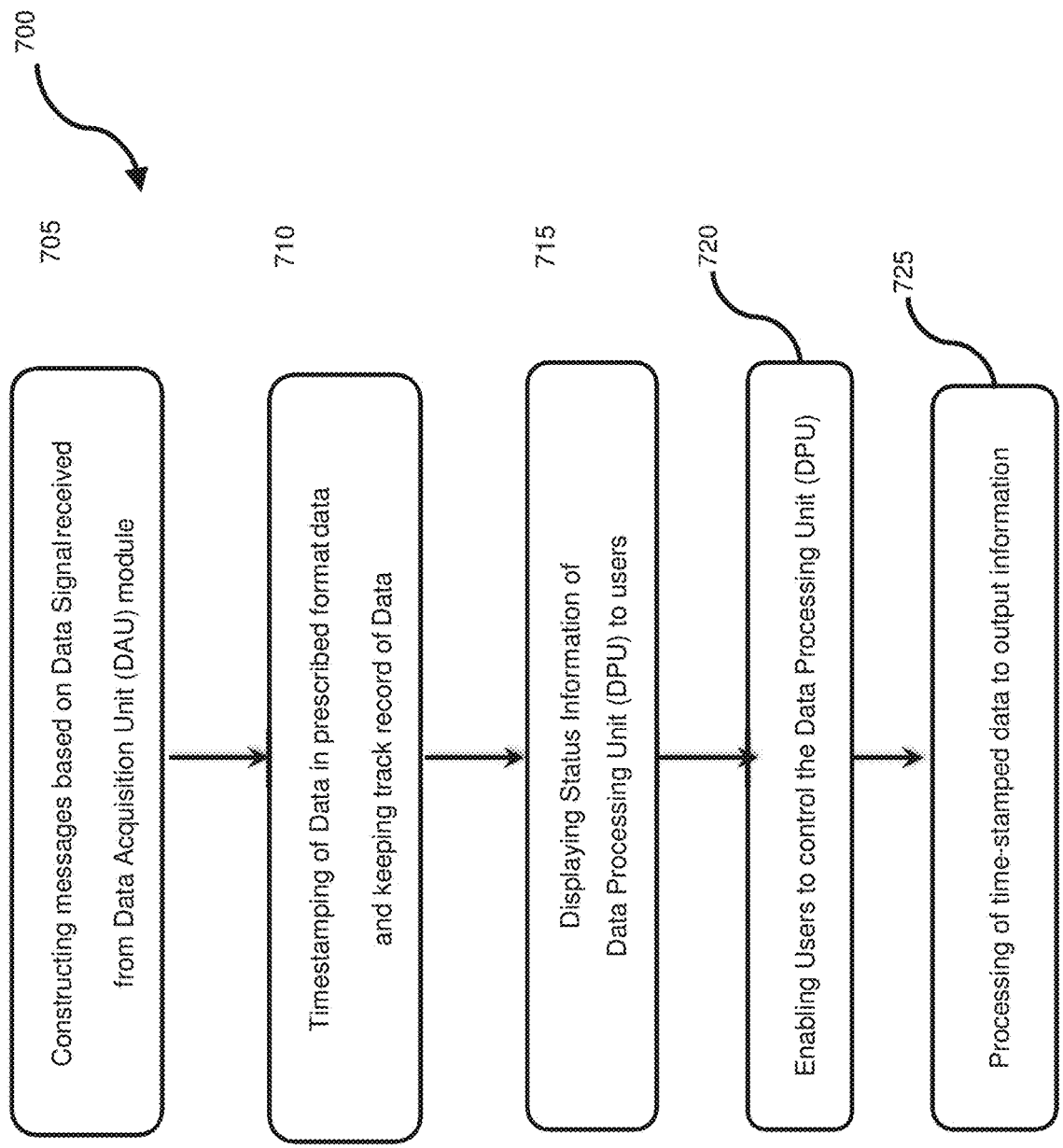
FIG. 7 illustrates a flow diagram illustrating a steps for analyzing data by the Data Processing Unit (DPU) module of General Purpose Interface Bus (GPIB) sniffer system.

FIG. 7 illustrates a flow diagram illustrating steps for analyzing data by the Data Processing Unit (DPU) module 120 of General Purpose Interface Bus (GPIB) sniffer system 100. The method 700 for analyzing data by the Data Processing Unit (DPU) module 120 of the General Purpose Interface Bus (GPIB) sniffer system 100 is configured to execute a set of instructions. The method 700 starts at step 705. At step 705, the Data Processing Unit (DPU) module 120 constructs one or more messages based on data signal received from the Data Acquisition Unit (DAU) module 115.

The method 700 proceeds to step 710. At step 710, the data is time stamped in a prescribed format and method 700 also provides the system 100 the time for keeping track record of the prescribed format data.

In one embodiment, the prescribed format data is a JSON format data structure.

The method 700 then proceeds to step 715. At step 715, status information is displayed by the Data Processing Unit (DPU) module 120 to one or more users. The method 700 then proceeds to step 720. At step 720, one or more users are enabled to control the Data Processing Unit (DPU) module 120.

Therefore, as may be seen, various embodiments of the present invention, as herein described above, provide need for developing the method and system of capturing the events without disturbing the ongoing events. The present technology of capturing events on the General Purpose Interface Bus (GPIB) sniffer system without interrupting existing operation of the system of the GPIB Bus. The present invention illustrates a new and complete way for capturing and processing data by the General Purpose Interface Bus (GPIB) sniffer without participating in handshake mechanism then transferring to cloud for big data analysis. The present invention of General Purpose Interface Bus (GPIB) sniffer provides a system and method to efficiently utilize equipment and evaluate the overall efficiency of the test system as a standalone equipment.

The invention claimed is:

1. A General Purpose Interface Bus (GPIB) sniffer system which is a bus-based network comprising:
   a Data Acquisition Unit (DAU) module configured to capture data traffic on a General Purpose Interface Bus (GPIB) bus;
   a Data Processing Unit (DPU) module configured to receive data from said Data Acquisition Unit (DAU) module and convert said data by time-stamping in a prescribed format;
   a host server configured to receive said prescribed format data via a communication network;
   wherein said General Purpose Interface Bus (GPIB) module sniffer system is configured to transmit and receive data in a General Purpose Interface Bus (GPIB) format, and
   wherein the Data Acquisition Unit (DAU) module further comprises:
      a General Purpose Interface Bus (GPIB) tranceiver, operably configured to provide an electrical compatibilty between Data Acquisition Unit (DAU) and General Purpose Interface Bus (GPIB);

a latching circuitry configured to latch a data signal, wherein a data input receives said data signal;

a Microcontroller (MCU) retrieves said data signal state captured by said latching circuitry; and a universal serial bus (USB) interface configured to be coupled to said Microcontroller (MCU) for transferring said data signal to said Data Processing Unit (DPU) module;

wherein said Data Acquisition Unit (DAU) module is configured to capture data traffic without participating in General Purpose Interface Bus (GPIB) handshake mechanism.

2. The Data Processing Unit (DPU) module of General Purpose Interface Bus (GPIB) sniffer system of claim 1, further comprises a central computing module having an instruction for constructing messages;

a Real-time Clock (RTC) configured to provide time-stamping of said prescribed format data and provide system time for keeping track record of prescribed format data;

a battery backup module configured to protect said central computing module from data corruption during unplanned power outage;

a visual display interface configured to display status information of said Data Processing Unit (DPU) to a plurality of users;

a keypad input configured to enable said plurality of users to control said Data Processing Unit (DPU); and an interconnect board module configured to provide means for connecting said central computing module, said Real-time Clock (RTC), said visual display interface, said battery backup module and said keypad input.

3. The General Purpose Interface Bus (GPIB) sniffer system of claim 2, wherein said Data Processing Unit (DPU) module is further configured to develop a firmware for displaying status information of said system and said system is remotely controlled by at least one client device.

4. The General Purpose Interface Bus (GPIB) sniffer system of claim 1, wherein said latching circuitry is further triggered to capture said data signals by transferring data via General Purpose Interface Bus (GPIB).

5. The General Purpose Interface Bus (GPIB) sniffer system of claim 1, wherein said data are events on at least one of said GPIB bus.

6. The General Purpose Interface Bus (GPIB) sniffer system of claim 1, wherein said microcontroller (MCU) is further configured to timestamp said data signal captured by said latching circuitry and forming a multi-byte data block stored temporarily in an internal buffer.

7. The General Purpose Interface Bus (GPIB) sniffer system of claim 6, wherein said universal serial bus (USB) interface transfers said multi-byte data block from said internal buffer to said DPU of said General Purpose Interface Bus (GPIB) sniffer.

8. The General Purpose Interface Bus (GPIB) sniffer system of claim 2, wherein said central computing module extracts data information from said Data Acquisition Unit (DAU) module and further configured to construct a plurality of messages, timestamping said plurality of messages in said prescribed format data and storing said plurality of messages to said server via said communication network.

9. The General Purpose Interface Bus (GPIB) sniffer system of claim 8, wherein said prescribed format data is a JavaScript Object Notation (JSON) format data structure.

10. A method for analyzing data in a General Purpose Interface Bus (GPIB) sniffer system by one or more communication connections, said method comprising the steps of:

transmitting and receiving data in a General Purpose Interface Bus (GPIB) format;

capturing data traffic on a General Purpose Interface Bus (GPIB) bus;

receiving data and converting said data to generate time-stamped data in a prescribed format executed by a Data Processing Unit (DPU) module; and communicating said time-stamped data in a prescribed format via a communication network to a host server;

processing said time-stamped data to output information about timing of the data stored; and capturing data and performing semantics analysis of said data by utilizing big data analysis, wherein collected and generated big data from several sources of the General Purpose Interface Bus (GPIB) sniffer system is data mined and stored in a host server, and wherein said General Purpose Interface Bus (GPIB) sniffer system is configured to transmit and receive data in a General Purpose Interface Bus (GPIB) format.

11. The method for analyzing data of claim 10, wherein a Data Acquisition Unit (DAU) module of General Purpose Interface Bus (GPIB) sniffer system is configured to execute a set of instructions comprising:

providing an electrical compatibility between said Data Acquisition Unit (DAU) module and said General Purpose Interface Bus (GPIB);

latching a data signal received by a data input;

retrieving said data signal state captured by a latching circuitry; and transferring said data signal to said Data Processing Unit (DPU) module via a universal serial bus (USB) interface;

wherein said universal serial bus (USB) interface is configured to be coupled to a Microcontroller (MCU) for transferring said data signal to said Data Processing Unit (DPU) module.

12. The method for analyzing data of claim 11, wherein said Data Processing Unit (DPU) module of General Purpose Interface Bus (GPIB) sniffer system is configured to execute a set of instructions comprising:

constructing a plurality of messages based on data signal received from said Data Acquisition Unit (DAU) module;

providing timestamping of a prescribed format data and provide system time for keeping track record of said prescribed format data;

displaying status information of said Data Processing Unit (DPU) to a plurality of users; and enabling said plurality of users to control said Data Processing Unit (DPU).

13. The method for analyzing data of claim 12, wherein said Data Processing Unit (DPU) module of General Purpose Interface Bus (GPIB) sniffer system is configured to protect a central computing module from data corruption during unplanned power outage by a battery backup module.

14. The method for analyzing data of claim 12, wherein means for connecting a central computing module, a Real-time Clock (RTC), a visual display interface, a battery backup module and a keypad input is provided by an interconnect board module.

15. The method for analyzing data of claim 12, wherein said Data Processing Unit (DPU) module is further configured to develop a firmware for displaying status information of said system and said system is remotely controlled by at least one client device for efficient equipment utilization and evaluating overall efficiency of a test system.

16. The method for analyzing data of claim 12, wherein a latching circuitry is further triggered to capture said data signals by transferring data via said General Purpose Interface Bus (GPIB).

17. The method for analyzing data of claim 15, wherein said test system is any one of GPIB devices, measurement equipments, measurement instruments, power supplies, multimeters, oscilloscopes and the like.

18. The method for analyzing data of claim 12, wherein said prescribed format data is a JavaScript Object Notation (JSON) format data structure.

19. A General Purpose Interface Bus (GPIB) sniffer system which is a bus-based network comprising:
- a Data Acquisition Unit (DAU) module configured to capture data traffic on a General Purpose Interface Bus (GPIB) bus;
- a Data Processing Unit (DPU) module configured to receive data from said Data Acquisition Unit (DAU) module and convert said data by time-stamping in a prescribed format; and
- a host server configured to receive said prescribed format data via a communication network;

wherein said General Purpose Interface Bus (GPIB) module configured to transmit and receive data in a General Purpose Interface Bus (GPIB) format, and wherein the Data Processing Unit (DPU) module of General Purpose Interface Bus (GPIB) sniffer system of claim 1, further comprises:
- a central computing module having an instruction for constructing messages;
- a Real-time Clock (RTC) configured to provide time-stamping of said prescribed format data and provide system time for keeping track record of prescribed format data;
- a battery backup module configured to protect said central computing module from data corruption during unplanned power outage;
- a visual display interface configured to display status information of said Data Processing Unit (DPU) to a plurality of users;
- a keypad input configured to enable said plurality of users to control said Data Processing Unit (DPU); and
- an interconnect board module configured to provide means for connecting said central computing module, said Real-time Clock (RTC), said visual display interface, said battery backup module and said keypad input.

\* \* \* \* \*